(12) United States Patent
Kwon et al.

(10) Patent No.: US 11,232,759 B2
(45) Date of Patent: Jan. 25, 2022

(54) DISPLAY APPARATUS

(71) Applicant: SAMSUNG DISPLAY CO, LTD., Yongin-si (KR)

(72) Inventors: Jaejoong Kwon, Yongin-si (KR); Youngjun Seo, Yongin-si (KR); Hyesog Lee, Yongin-si (KR); Hyosun Kim, Yongin-si (KR); Byungchoon Yang, Yongin-si (KR); Chio Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 762 days.

(21) Appl. No.: 14/930,969

(22) Filed: Nov. 3, 2015

(65) Prior Publication Data

US 2016/0293119 A1 Oct. 6, 2016

(30) Foreign Application Priority Data

Apr. 1, 2015 (KR) .......................... 10-2015-0046192

(51) Int. Cl.
*G09G 3/36* (2006.01)
*G09G 3/3208* (2016.01)
(Continued)

(52) U.S. Cl.
CPC ............. *G09G 3/36* (2013.01); *G02F 1/0072* (2013.01); *G02F 1/0147* (2013.01); *G02F 1/29* (2013.01);
(Continued)

(58) Field of Classification Search
CPC ...... G09G 3/36; G09G 3/3611; G09G 3/3208; G09G 3/003; G02F 1/0072; G02F 1/29; G02F 1/0147; G02F 2201/44
See application file for complete search history.

(56) References Cited

U.S. PATENT DOCUMENTS 6,157,487 A 12/2000 Staub et al.
9,541,965 B1 * 1/2017 Mukherjee ............ G06F 1/1643
(Continued)

FOREIGN PATENT DOCUMENTS

| CN | 104459987 | 3/2015 |
|----|-----------|--------|
| JP | 2006-215372 | 8/2006 |

(Continued)

OTHER PUBLICATIONS

Joseph Volpe, "Disney Rendered Its New Animated Film On a 55.000-Core Supercomputer", http://www.engadget.com/2014/10/18/disney-big-hero-6/, Oct. 18, 2014, pp. 1-7.
(Continued)

*Primary Examiner* — Patrick N Edouard
*Assistant Examiner* — Joseph P Fox
(74) *Attorney, Agent, or Firm* — F. Chau & Associates, LLC (57) ABSTRACT

A display apparatus is provided. The display apparatus includes a display panel, a first layer, a signal applying unit, and a controller. The display panel displays an image. The first layer is formed on a first surface of the display panel. A shape of the first layer is changed when a first signal is applied to the first layer. The signal applying unit applies the first signal to the first layer. The controller controls the display panel to display the image.

18 Claims, 5 Drawing Sheets

(51) Int. Cl.
    *G02F 1/00*     (2006.01)
    *G02F 1/29*     (2006.01)
    *G02F 1/01*     (2006.01)
    *G09G 3/00*     (2006.01)

(52) U.S. Cl.
    CPC ......... *G09G 3/3208* (2013.01); *G09G 3/3611* (2013.01); *G02F 2201/44* (2013.01); *G09G 3/003* (2013.01)

(56) References Cited

U.S. PATENT DOCUMENTS

| | | | |
|---|---|---|---|
| 2008/0010593 A1* | 1/2008 | Uusitalo | G06F 3/016 715/702 |
| 2008/0110390 A1* | 5/2008 | Peterson | G09B 21/003 114/361 |
| 2008/0218488 A1* | 9/2008 | Yang | G09G 3/20 345/173 |
| 2008/0316374 A1 | 12/2008 | Koike et al. | |
| 2009/0115705 A1* | 5/2009 | Miller | G09G 3/3208 345/76 |
| 2009/0128503 A1* | 5/2009 | Grant | G06F 3/04886 345/173 |
| 2009/0167704 A1* | 7/2009 | Terlizzi | G06F 3/016 345/173 |
| 2011/0148871 A1 | 6/2011 | Kim et al. | |
| 2011/0310111 A1 | 12/2011 | Cho et al. | |
| 2014/0208204 A1* | 7/2014 | Lacroix | G06F 3/041 715/702 |
| 2015/0042702 A1* | 2/2015 | Jiang | G09G 3/3413 345/694 |
| 2016/0030835 A1* | 2/2016 | Argiro | A63F 13/02 463/33 |
| 2016/0267851 A1* | 9/2016 | Pirtskhlava | H01L 27/322 |
| 2017/0316733 A1* | 11/2017 | Du | H01L 51/56 |
| 2017/0345402 A1* | 11/2017 | Zhou | G06T 7/11 |

FOREIGN PATENT DOCUMENTS

| | | |
|---|---|---|
| JP | 2009-3166 | 1/2009 |
| KR | 10-2000-0016445 | 3/2000 |
| KR | 10-0865622 | 10/2008 |
| KR | 10-2011-0071767 | 6/2011 |
| KR | 10-2011-0137629 | 12/2011 |
| KR | 10-1413046 | 7/2014 |
| KR | 10-2015-0033004 | 4/2015 |
| WO | 2009012850 | 1/2009 |

OTHER PUBLICATIONS

Takashi Ubukata et al., "Reversible Phototriggered Micromanufacturing Using Amorphous Photoresponsive Spirooxazine Film", Journal of Materials Chemistry, 2009, 19, pp. 3373-3377.

Estibaliz Merino et al., "Control Over Molecular Motion Using the Cis-Trans Photoisomerization of the Azo Group", Beilstein Journal of Organic Chemistry, 2012, 8, pp. 1071-1090.

Decision on Registration dated Jul. 30, 2021, issued in the corresponding Korean Patent Application No. 10-2015-0046192.

\* cited by examiner

DISPLAY APPARATUS

CROSS-REFERENCE TO RELATED APPLICATION

This application claims priority under 35 U.S.C. § 119(a) to Korean Patent Application No. 10-2015-0046192, filed on Apr. 1, 2015, in the Korean Intellectual Property Office, the disclosure of which is incorporated by reference herein in its entirety.

TECHNICAL FIELD

Exemplary embodiments of the present inventive concept relate to a display apparatus, and more particularly, to a display apparatus capable of representing a texture in an image.

DISCUSSION OF THE RELATED ART

Recently, display panel technologies for displaying realistic images have been developed. Display quality of the realistic image may be decreased due to light reflection occurring throughout a surface of the display panel. For example, a viewer may recognize a display image combined with reflected light through the surface of the display panel, and thus, reality of the image may be decreased.

SUMMARY

According to an exemplary embodiment of the present inventive concept, a display apparatus is provided. The display apparatus includes a display panel, a first layer, a signal applying unit, and a controller. The display panel displays an image. The first layer is formed on a first surface of the display panel. A shape of the first layer is changed when a first signal is applied to the first layer. The signal applying unit applies the first signal to the first layer. The controller controls the display panel to display the image.

The signal applying unit may include a plurality of control elements applying the first signal to the first layer.

Each of the plurality of control elements may correspond to at least one pixel of the display panel.

The signal applying unit may be disposed in the display panel.

The signal applying unit may be disposed between the display panel and the first layer.

The first layer may include a material of which a shape is changed by ultraviolet rays.

The signal applying unit may include a plurality of optical elements providing the ultraviolet rays to the first layer.

The display panel may be an organic light-emitting display panel. Each of the plurality of optical elements may include an organic light-emitting display device emitting the ultraviolet rays.

The display panel may be a liquid-crystal panel. Each of the plurality of optical elements may include an ultraviolet band pass filter passing the ultraviolet rays.

The ultraviolet band pass filter may be arranged with an array of a red filter, a green filter, and a blue filter in the liquid-crystal panel.

The display apparatus may further include a backlight unit providing visible rays and the ultraviolet rays to the liquid-crystal panel.

An ultraviolet blocking filter may be formed on a surface of the first layer.

The first layer may include a material of which a shape is changed according to heat energy applied to the first layer.

The signal applying unit may include a plurality of heaters transferring the heat energy to the first layer.

The first layer may include a material of which a shape is changed by an electric field.

The signal applying unit may include a plurality of electrodes forming the electric field on the first layer.

The controller may control the signal applying unit to be driven according to a surface adjust signal corresponding to the image.

According to an exemplary embodiment of the present inventive concept, a display apparatus is provided. The display apparatus includes a display panel, a first layer, and a plurality of control elements. The display panel displays an image. The first layer is formed on a first surface of the display panel. A shape of the first layer is changed when a first signal is applied to the first layer. The plurality of control elements applies the first signal to the first layer. The plurality of control elements includes at least one of a light source, a heat source, or an electrode.

The plurality of control elements may be disposed in the display panel or between the display panel and the first layer.

An ultraviolet blocking filter may be formed on a surface of the first layer.

BRIEF DESCRIPTION OF THE DRAWINGS

The above and other features of the present inventive concept will become apparent from the following description of the exemplary embodiments thereof, taken in conjunction with the accompanying drawings in which.

DETAILED DESCRIPTION OF THE EMBODIMENTS

Hereinafter, exemplary embodiments of the present inventive concept will be described in more detail with reference to the accompanying drawings. The present inventive concept, however, may be embodied in various forms and should not be construed as being limited to the exemplary embodiments set forth herein. Like reference numbers may refer to like elements throughout the specification and drawings. All the elements throughout the specification and drawings may be circuits.

As used herein, the singular forms "a," "an," and "the" are intended to include the plural forms as well, unless the context clearly indicates otherwise.

It will be understood that when a layer, region, or component is referred to as being "formed on," another layer, region, or component, it can be directly or indirectly formed on the other layer, region, or component.

Sizes of elements in the drawings may be exaggerated for convenience of explanation.

Figure 1:
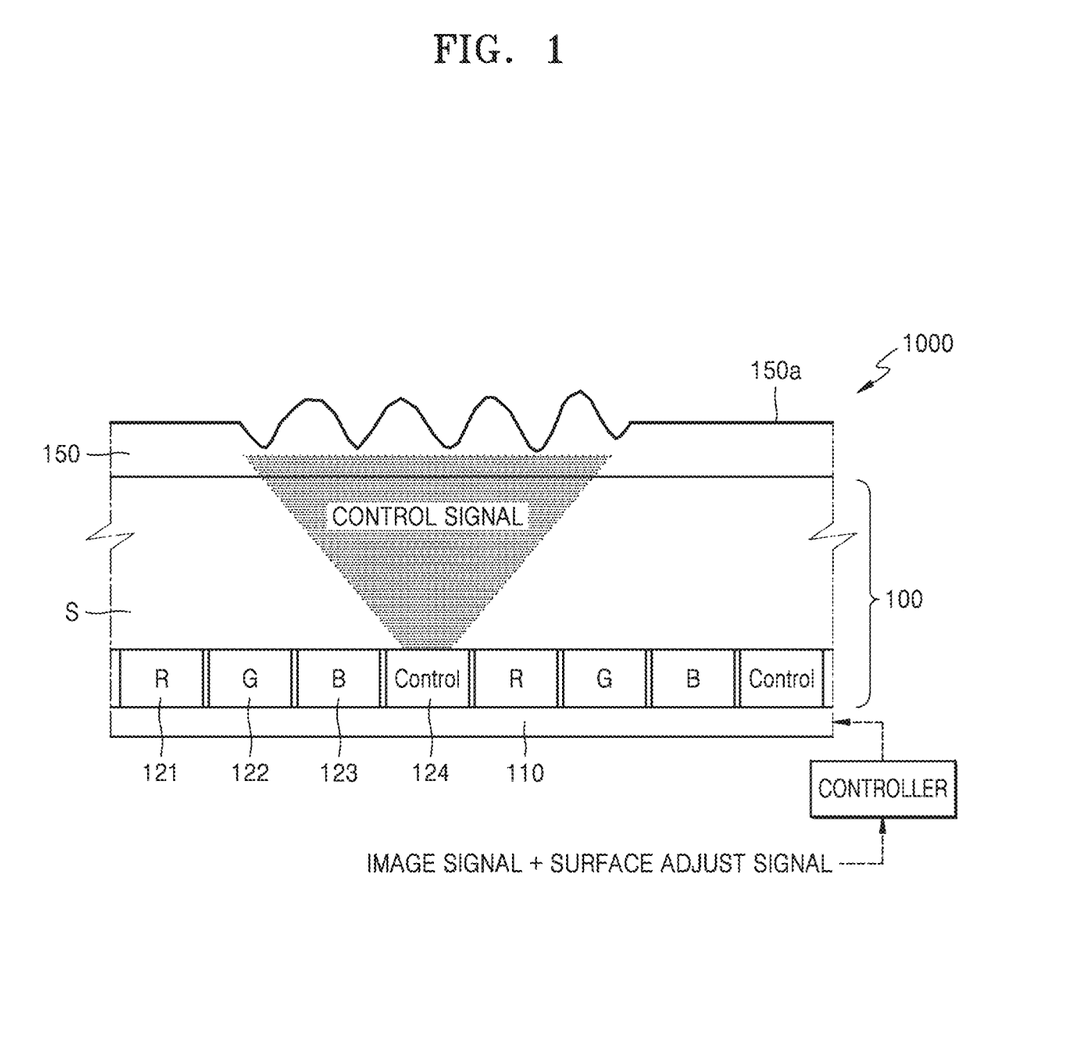
FIG. 1 is a diagram of a display apparatus according to an exemplary embodiment of the present inventive concept.

FIG. 1 is a diagram of a display apparatus 1000 according to an exemplary embodiment of the present inventive concept.

The display apparatus 1000 includes a display panel 100 and a shape-variable material layer 150 formed on a display surface of the display panel 100. In addition, the display apparatus 1000 includes a signal applying unit and a controller. The signal applying unit is configured to apply a signal for shape variation to the shape-variable material layer 150, and the controller is configured to control the display panel 100 such that the display panel 100 is driven according to an image signal.

The shape-variable material layer 150 may be formed of a material of which a shape is reversibly changed according to whether a predetermined signal is applied to the shape-variable material layer 150. For example, the shape-variable material layer 150 may be formed of a material of which a shape is changed when a certain signal is applied to the shape-variable material layer 150, so that a surface roughness of the shape-variable material layer 150 is changed, and the shape of the material is recovered to an original shape when the signal is not applied to the shape-variable material layer 150. For example, the surface roughness of the shape-variable material layer 150 is adjusted based on a signal applied thereto. The shape-variable material layer 150 may include, for example, a material of which a shape is changed due to an external signal. For example, the shape-variable material layer 150 may be formed of a material of which a shape is changed by light, a material of which a shape is changed by heat energy, or a material of which a shape is changed by an electrical signal, for example, an electric field. The shape-variable material layer 150 may include a polymer containing azobenzene, amorphous spirooxazin, vanadium dioxide ($VO_2$), polyvinylidene fluoride (PVDF), lead zirconate titanate (PZT), or the like.

The display panel 100 includes an array of a plurality of display elements (e.g., a red display element 121, a green display element 122, and a blue display element 123) that represents colors. For example, the display panel 110 includes an array of the red display element 121, the green display element 122, and the blue display element 123 arranged between a driving circuit unit 110 and a display substrate S.

The red, green, and blue display elements 121, 122, and 123 may be formed of various types of display devices. For example, each of the red display element 121, the green display element 122, and the blue display element 123 may be formed of any of a liquid-crystal device, an organic light-emitting device (OLED), an electrophoretic device, an electrochromic device, an electrowetting device, or the like.

The driving circuit unit 110 includes a thin film transistor for controlling each of the red display element 121, the green display element 122, and the blue display element 123. The driving circuit unit 110 further includes gate wirings and data wirings for supplying signals to the thin film transistor. The driving circuit unit 110 is controlled by the controller and drives the red display element 121, the green display element 122, and the blue display element 123.

The signal applying unit includes a plurality of control elements 124. The control elements 124 may include, for example, a light source, a heat source, an electrode, or the like, according to characteristics (e.g., types) of signals used for shape variation of the shape-variable material layer 150. The plurality of control elements 124 may be arranged in two-dimensional (2D) space. The control elements 124 may be arranged with the red, green, and blue display elements 121, 122, and 123, according to a predetermined rule. FIG. 1 illustrates that the control elements 124 are provided such that the number of control elements corresponds to the number of pixels of the display panel, and each pixel includes red R, green G, and blue B sub-pixels. However, this is merely exemplary. For example, in an exemplary embodiment of the present inventive concept, one control element 124 may be arranged to correspond to a plurality of pixels.

The driving circuit unit 110 may include a thin film transistor for driving the plurality of display elements (e.g., the red display element 121, the green display element 122, and the blue display element 123) and a thin film transistor for driving each of the plurality of control elements 124.

The plurality of control elements 124 may apply a control signal to the shape-variable material layer 150, and a shape of a surface 150a of the shape-variable material layer 150 is changed according to the applied control signal. For example, the control signal may correspond to an amount of light, an amount of heat energy, an electric field (e.g., a voltage), or the like. A degree of change in the surface shape may be adjusted according to whether the control signal is applied, or may be adjusted according to the amplitude of the control signal. The surface shape is changed to increase reality of a displayed image, and thus, the degree of surface roughness is determined to be appropriate for the displayed image. For example, the controller controls the plurality of control elements 124 such that the plurality of control elements 124 are driven according to a surface adjust signal, which may be in connection with the image signal.

Although FIG. 1 illustrates that the control elements 124 included in the signal applying unit are provided in the display panel 100, this is merely exemplary. For example, the signal applying unit may be provided between the shape-variable material layer 150 and the display panel 100.

FIGS. 2, 3A, 3B, and 3C each illustrate that a shape of the shape-variable material layer 150 is adjusted to represent a texture change according to an area of an image displayed on the display apparatus 1000 according to an exemplary embodiment of the present inventive concept.

Figure 2:
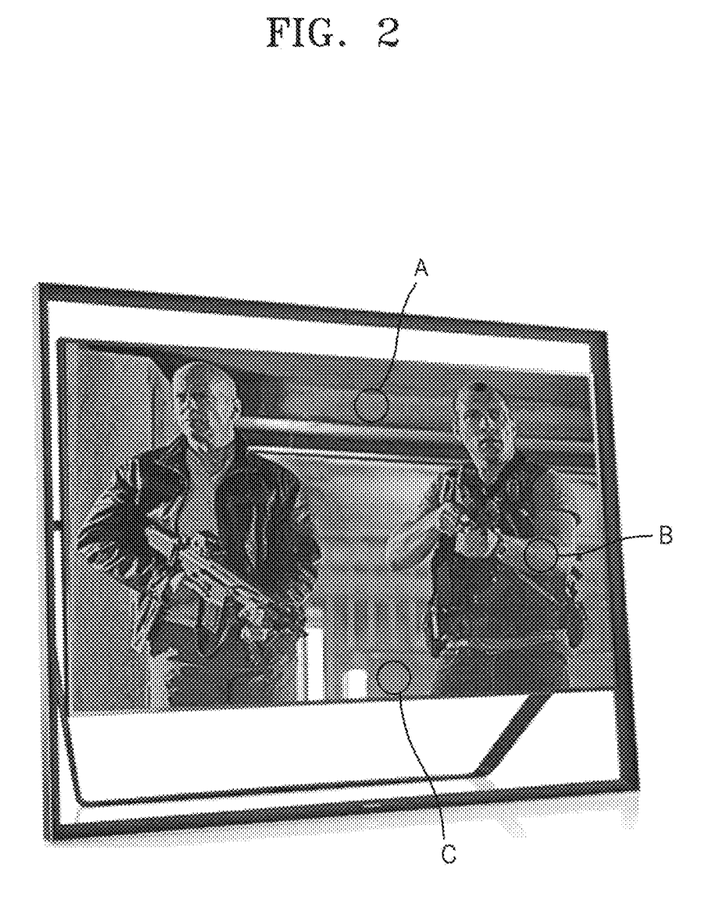
FIGS. 2, 3A, 3B, and 3C each illustrate that a shape of a shape-variable material layer is adjusted to represent a texture change according to an area of an image displayed on a display apparatus according to an exemplary embodiment of the present inventive concept.

Referring to FIG. 2, areas A, B, and C in an image displayed on the display apparatus 1000 may have different textures from each other, and thus, when such textures are represented through a displayed image, the reality of the image may be increased.

Figure 3A:
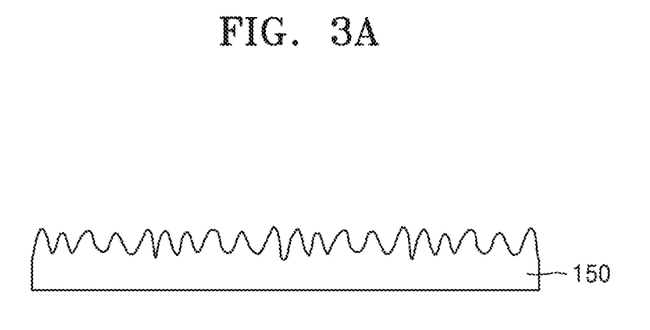
Figure 3B:
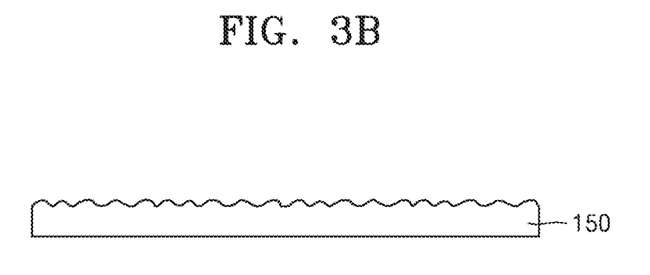
Figure 3C:
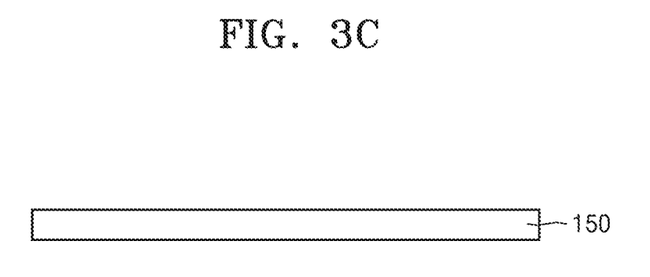

Each of FIGS. 3A, 3B, and 3C illustrates a shape of the surface of the shape-variable material layer 150 at a corresponding one of areas A, B, and C. Referring to FIG. 3A, since the area A corresponds to a cement wall representing a relatively rough texture, the surface roughness of the shape-variable material layer 150 is adjusted to be increased. In addition, referring to FIG. 3B, since the area B corresponds to human skin representing a relatively soft texture, the surface roughness of the shape-variable material layer 150 is adjusted to be decreased. In addition, referring to FIG. 3C, since the area C corresponds to glass representing a relatively smooth texture, the surface roughness of the shape-variable material layer 150 is adjusted to have a value that is near 0.

Hereinafter, a display apparatus capable of realizing a realistic image by adjusting a surface roughness of the shape-variable material layer 151 will be described, according to an exemplary embodiment of the present inventive concept.

Figure 4:
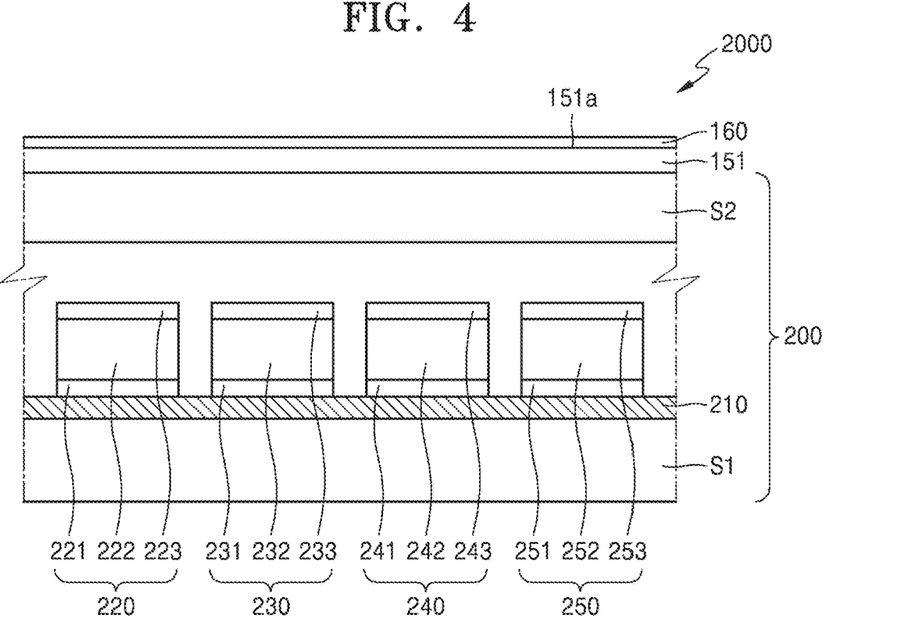
FIG. 4 is a cross-sectional view of a display apparatus according to an exemplary embodiment of the present inventive concept.

FIG. 4 is a cross-sectional view of a display apparatus 2000 according to an exemplary embodiment of the present inventive concept.

The display apparatus 2000 includes an organic light-emitting display panel 200 and a shape-variable material layer 151. The shape-variable material layer 151 may be formed of a material of which a shape is changed by ultraviolet (UV) rays. Various types of photoisomerization materials may be used for the shape-variable material layer 151. For example, a polymer containing azobenzene, amorphous spirooxazin, etc. may be used for the shape-variable material layer 151.

The UV rays may change the shape of the shape-variable material layer 151 and may be provided by a UV organic light-emitting device 250 arranged in the organic light-emitting display panel 200. For example, the organic light-emitting display panel 200 includes a first substrate S1, a second substrate S2, and a red organic light-emitting device 220, a green organic light-emitting device 230, and a blue organic light-emitting device 240 arranged between the first substrate S1 and the second substrate S2. In addition, the organic light-emitting display panel 200 further includes the UV organic light-emitting device 250 for providing the UV rays to the shape-variable material layer 151. A driving circuit unit 210 for driving the red, green, blue, and UV organic light-emitting devices 220, 230, 240, and 250 is provided on the first substrate S1.

A UV blocking filter 160 may further be formed on a surface of the shape-variable material layer 151. When the UV blocking filter 160 is provided on a surface 151a of the shape-variable material layer 151, UV rays may be prevented from being emitted to the outside from the UV organic light-emitting device 250, or UV rays may be prevented from being transferred from the outside to the shape-variable material layer 151.

The red organic light-emitting device 220 includes an anode 221, an organic layer 222, and a cathode 223. The green organic light-emitting device 230 includes an anode 231, an organic layer 232, and a cathode 233. The blue organic light-emitting device 240 includes an anode 241, an organic layer 242, and a cathode 243. The UV red organic light-emitting device 250 includes an anode 251, an organic layer 252, and a cathode 253. Although each of the organic layers 222, 232, 242, and 252 is illustrated as a single layer in FIG. 4, for purpose of illustration, each of the organic layers 222, 232, 242, and 252 may be formed as a plurality of layers including a hole injection layer, a hole transport layer, an emission layer, an electron transport layer, and an electron injection layer. Wavelength bands of light emitted through each of the red, green, blue, UV organic light-emitting devices 220, 230, 240, and 250 may correspond to wavelength bands of red, green, blue colors of light, and UV rays, respectively, by adjusting materials, thicknesses, etc. of the above layers.

Each of the anodes 221, 231, 241, and 251 may be formed of a non-transparent metal, such as aluminum (Al), or the like, and each of the cathodes 223, 233, 243, and 253 may be formed as an oxide transparent electrode such as indium tin oxide (ITO), or a semitransparent electrode of a nickel (Ni) thin layer, so that light emitted from the organic layers 222, 232, 242, and 252 may easily penetrate the cathodes 223, 233, 243, and 253.

When a forward voltage is applied between each of the anodes 221, 231, 241, and 251 and each of the cathodes 223, 233, 243, and 253 (e.g., a positive voltage is applied to each of the cathodes 223, 233, 243, and 253 and a negative or zero voltage is applied to each of the anodes 221, 231, 241, and 251), electrons move from each of the cathodes 223, 233, 243, and 253 to the emission layer via the electron injection layer and the electron transport layer, and holes move from each of the anodes 221, 231, 241, and 251 to the emission layer via the hole injection layer and the hole transport layer. In addition, the electrons and the holes injected (e.g., moved) in the emission layer are recombined in the emission layer to generate excitons. When the excitons are transitioned from an excited state to a ground state, light is emitted. Here, the luminance of the emitted light is proportional to the amount of current flowing between the anodes 221, 231, 241, and 251 and the cathodes 223, 233, 243, and 253.

The driving circuit unit 210 includes a circuit for driving each pixel of the organic light-emitting display panel 200. For example, the driving circuit unit 210 may include a gate line and a data line crossing the gate line, a switching thin film transistor connected to the gate line and the data line, a driving thin film transistor connected to the organic light-emitting device between the switching thin film transistor and a power line, and a storage capacitor connected between a gate electrode of the driving thin film transistor and the power line.

The amount of current supplied to each of the organic light-emitting devices 220, 230, 240, and 250 is controlled according to a data signal. In addition, the luminance of each of the organic light-emitting devices 220, 230, 240, and 250 is controlled according to the data signal. Here, a data signal applied to each of the red organic light-emitting device 220, the green organic light-emitting device 230, and the blue organic light-emitting device 240 is controlled according to an image signal, and a data signal applied to the UV organic light-emitting device 250 is controlled according to a surface adjust signal. The surface adjust signal is provided in connection with an image that is to be displayed. Accordingly, since the surface roughness of the shape-variable material layer 151 is adjusted based on the image information (e.g., texture information of an image), a realistic image may be provided.

Although it is illustrated in FIG. 4 that the red organic light-emitting devices 220, the green organic light-emitting devices 230, the blue organic light-emitting devices 240, and the UV organic light-emitting devices 250 have the same numbers as each other, this is merely exemplary. For example, the UV organic light-emitting device 250 may be configured to adjust the surface roughness of the shape-variable material layer 151, and thus, the number of UV organic light-emitting devices 250 may not correspond to the number of pixels for displaying an image. For example, the number of UV organic light-emitting devices 250 may be less than the number of pixels.

Figure 5:
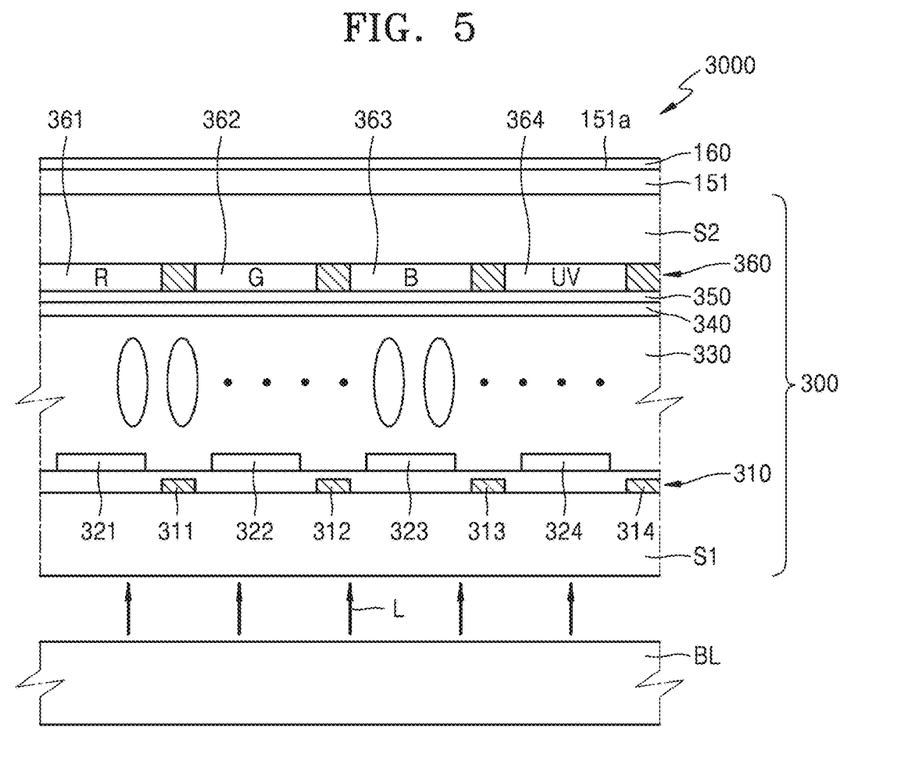
FIG. 5 is a cross-sectional view of a display apparatus according to an exemplary embodiment of the present inventive concept.

FIG. 5 is a cross-sectional view of a display apparatus 3000 according to an exemplary embodiment of the present inventive concept.

The display apparatus 3000 includes a liquid-crystal panel 300 and the shape-variable material layer 151. The display apparatus 3000 further includes a backlight unit BL configured to provide light for forming an image on the liquid-crystal panel 300.

The shape-variable material layer 151 may be formed of a material of which a shape is changed by UV rays. Various types of photoisomerization materials may be used for the shape-variable material layer 151. For example, a polymer containing azobenzene, amorphous spirooxazin, etc. may be used for the shape-variable material layer 151.

The liquid-crystal panel 300 includes a first substrate S1, a second substrate S2, and a liquid-crystal layer 330 provided between the first substrate S1 and the second substrate S2. In addition, a driving circuit unit 310, pixel electrodes 321, 322, and 323, and a control electrode 324 are formed on the first substrate S1. A filter array layer 360, an overcoating layer 350, and a common electrode 340 are formed on the second substrate S2. In addition, the liquid-crystal panel 300 may further include alignment layers provided respectively on an upper surface and a lower surface of the liquid-crystal layer 330 for liquid-crystal alignment, and polarizing plates provided on the first substrate S1 and the second substrate S2.

The filter array layer 360 includes an array of a red color filter 361, a green color filter 362, and a blue color filter 363, and further includes an array of UV band pass filters 364. Although it is illustrated in FIG. 5 that the red color filters 361, the green color filters 362, the blue color filters 363, and the UV band pass filters 364 have the same numbers as each other, this is merely exemplary. For example, the number of UV band pass filters 364 may be less than the total number of pixels of the liquid-crystal panel 300.

The UV rays may change the shape of the shape-variable material layer 151 and may be supplied from the backlight unit BL. Light L supplied from the backlight unit BL may include visible rays for displaying an image, and include UV rays to be provided to the shape-variable material layer 151 for adjusting a surface roughness. After the transmittance of the light L is adjusted while the light L passes through the liquid-crystal layer 330, the light L is incident on the filter array layer 360. Each of the filters 361, 362, 363, and 364 of the filter array layer 360 passes through light of a corresponding wavelength band. For example, the filter 361 passes through a red color of light, the filter 362 passes through a green color of light, the filter 363 passes through a blue color of light, and the filter 364 passes through UV rays.

The UV blocking filter 160 may further be formed on the surface 151a of the shape-variable material layer 151. When the UV blocking filter 160 is provided on the surface 151a of the shape-variable material layer 151, the UV rays provided from the backlight unit BL and penetrating the UV band pass filter 364 may be prevented from being emitted to the outside from the shape-variable material layer 151, or the UV rays incident from the outside may be prevented from being transferred to the shape-variable material layer 151.

The driving circuit unit 310 includes a plurality of thin film transistors 311, 312, 313, and 314, a plurality of gate lines, and a plurality of data lines.

According to an electric field (e.g., a voltage) applied to the liquid-crystal layer 330, the arrangement of liquid-crystal molecules in the liquid-crystal layer 330 is changed. According to the arrangement of the liquid-crystal molecules, the polarization of light L penetrating the liquid-crystal layer 330 is controlled (e.g., maintained or changed), and thus, transmittance of the light L that penetrates the liquid-crystal layer 330 is adjusted. The transmittance of the light L in each pixel area is adjusted by a voltage between the common electrode 340 and each of the pixel electrodes 321, 322, and 323. A voltage applied to each of the pixel electrodes 321, 322, and 323 is supplied through each of the plurality of thin film transistors 311, 312, and 313 and a strength of the applied voltage is controlled according to a data signal provided according to an image signal. The image signal corresponds to an image to be displayed. Thus, the light L is provided to the red color filter 361, the green color filter 362, and the blue color filter 363 with an amount corresponding to the image to be displayed, and thus, the image is formed based on the amount of light L.

In addition, according to the transmittance of the liquid-crystal layer 330 disposed between the control electrode 324 and the common electrode 340, the amount of light L provided to the UV band pass filter 364 is adjusted. A voltage applied to the control electrode 324 is controlled by the thin film transistor 314.

Here, a surface adjust signal corresponding to an image to be displayed is applied to the thin film transistor 314, and the light L is provided to the surface-variable material layer 151 with an amount corresponding to a desired surface roughness according to a position in the shape-variable material layer 151.

Since an image is displayed on the liquid-crystal panel 300 by adjusting a surface roughness of the surface-variable material layer 151 based on the image information (e.g., texture information of an image), a realistic image is displayed.

Figure 6:
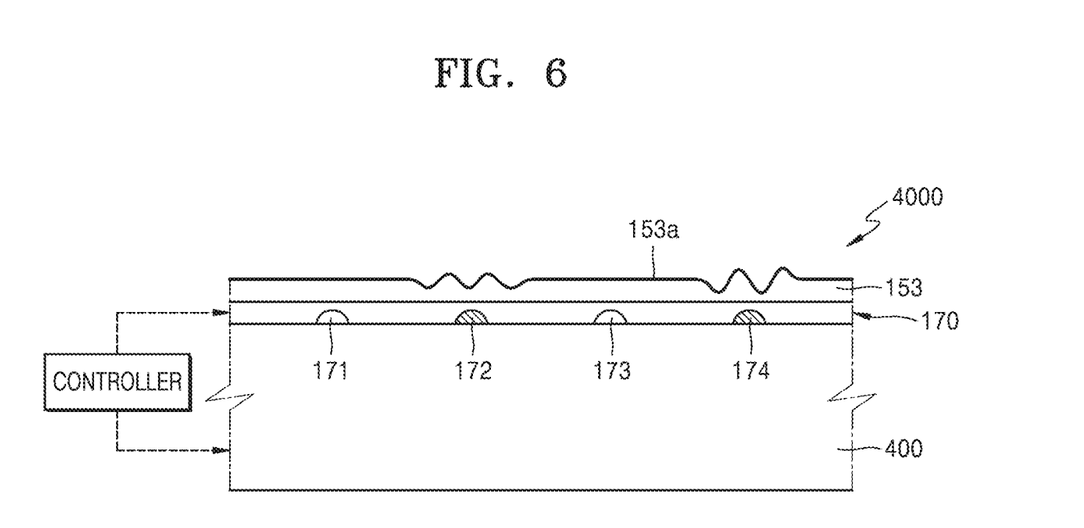
FIG. 6 is a cross-sectional view of a display apparatus according to an exemplary embodiment of the present inventive concept.

FIG. 6 is a cross-sectional view of a display apparatus 4000 according to an exemplary embodiment of the present inventive concept.

The display apparatus 4000 includes a display panel 400, a signal applying unit 170, and a shape-variable material layer 153.

The shape-variable material layer 153 may be formed of a material of which a shape is reversibly changed according to heat energy applied to the shape-variable material layer 153. The shape-variable material layer 153 may be formed of, for example, vanadium dioxide ($VO_2$), polyvinylidene fluoride (PVDF), or the like. The signal applying unit 170 applies heat energy to the shape-variable material layer 153. The signal applying unit 170 may include an array of a plurality of heaters 171, 172, 173, and 174 which may transfer heat energy to the shape-variable material layer 153. The heaters 171, 172, 173, and 174 may be formed of, for example, a resistor pattern in which heat is generated by e.g., Joule heating. However, the present inventive concept is not limited thereto, and the heaters 171, 172, 173, and 174 may be formed of an array of light sources.

The display panel 400 may have various structures. The display panel 400 may be the organic light-emitting display panel 200 or the liquid-crystal panel 300. In an exemplary embodiment of the present inventive concept, the display panel 400 may be a plasma display panel, an electrophoretic display panel, an electrowetting display panel, an electrochromic device, etc.

The display apparatus 4000 may include a controller for controlling the display panel 400 and the signal applying unit 170 such that the display panel 400 and the signal applying unit 170 are driven according to an image signal and a surface adjust signal, which may be in connection with the image signal. For example, as illustrated in FIG. 6, the heaters 172 and 174 may be driven in a selective manner or an independent manner, and surface roughness at areas (e.g., areas to which heat energy is transferred from the heaters 172 and 174) of the shape-variable material layer 153 corresponding to the heaters 172 and 174 may be changed. Portions of a surface 153a of the shape-variable material layer 153 that are shaped like a wave correspond to the areas whose surface roughness is changed when the heaters 172 and 174 are driven.

Figure 7:
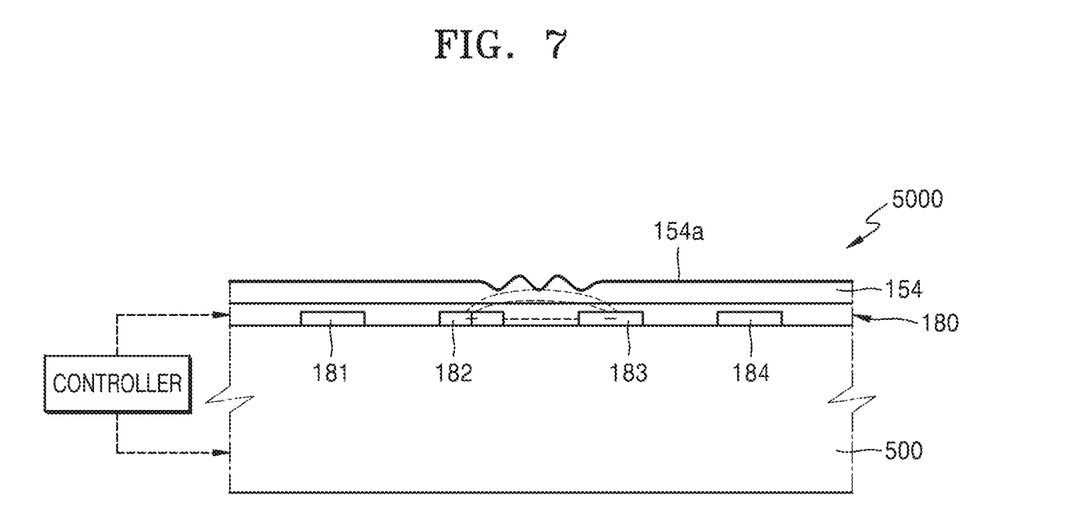
FIG. 7 is a cross-sectional view of a display apparatus according to an exemplary embodiment of the present inventive concept.

FIG. 7 is a cross-sectional view of a display apparatus 5000 according to an exemplary embodiment of the present inventive concept.

The display apparatus 5000 includes a display panel 500, a signal applying unit 180, and a shape-variable material layer 154. The shape-variable material layer 154 may be formed of a material of which a shape is reversibly changed according to an electric field formed in the shape-variable material layer 154. The shape-variable material layer 154 may be formed of, for example, a piezoelectric material such as PZT, or the like. The signal applying unit 180 forms an electric field on the shape-variable material layer 154. The signal applying unit 180 may include an array of a plurality of electrodes 181, 182, 183, and 184 to which a voltage is applied.

The display panel 500 may have various structures. In an exemplary embodiment of the present inventive concept, the display panel 500 may be the organic light-emitting display panel 200 or the liquid-crystal panel 300. In an exemplary embodiment of the present inventive concept, the display panel 500 may be a plasma display panel, an electrophoretic display panel, an electrowetting display panel, an electrochromic device, or the like.

The display apparatus 5000 may include a controller for controlling the display panel 500 and the signal applying unit 180 such that the display panel 500 and the signal applying unit 180 are driven according to an image signal and a surface adjust signal, which may be related to the image signal. For example, as illustrated in FIG. 7, a predetermined voltage is applied between the electrodes 182 and 183, and thus an electric field corresponding to the predetermined voltage may be formed on an area of the shape-variable material layer 154 between the electrodes 182 and 183. Accordingly, the surface roughness of the shape-variable material layer 154 may be adjusted according to an electric field. A portion of a surface 154a of the shape-variable material layer 154 that is shaped like a wave corresponds to the areas whose surface roughness is adjusted according to the electric field between the electrodes 182 and 183.

As described above, a display apparatus (e.g., the display apparatus 1000, 2000, 3000, 4000, or 5000) according to an exemplary embodiment of the present inventive concept may include a shape-variable material layer (e.g., the shape-variable material layer 150, 151, 153, and 154) and may represent (e.g., display) a texture by adjusting a surface roughness of the shape-variable material layer. The shape-variable material layer may be disposed on an outermost surface of a display panel in the display apparatus. Thus, the surface roughness of the shape-variable material layer may be adjusted in connection with a displayed image, and thus display of a realistic image may be achieved.

While exemplary embodiments of the present inventive concept have been particularly shown and described, it will be understood that various changes in form and details may be made therein without departing from the spirit and scope of the present inventive concept as defined by the following claims.

What is claimed is:

1. A display apparatus comprising:
a display panel comprising a plurality of pixels configured to emit a light to display an image;
a first layer formed on a first surface of the display panel, a surface roughness of the first layer being changed at a first area when a first signal is applied to the first layer, the surface roughness of the first layer being changed such that the first layer transitions from being flat to having continuous peaks and valleys in the first area, wherein heights of the peaks and depths of the valleys are adjustable based on texture information of the image, wherein a width of the first area where the first layer has the continuous peaks and valleys is the same as a width of the first signal at the first area, and wherein the first signal is different from the light emitted from the plurality of pixels;
a signal unit including a plurality of control elements wherein a first control element of the plurality of control elements generates the first signal, the first control element being sandwiched between adjacent pixels of the plurality of pixels; and
a controller controlling the display panel to display the image in response to an image signal and controlling the signal unit in response to a surface adjust signal, wherein all the pixels remain fixed in position when the surface roughness of the first layer is changed, and
wherein the pixels are controlled to display the image according to the image signal and the first control element is controlled to change the surface roughness of the first layer according to the surface adjust signal, the surface adjust signal being based on a texture represented by the image at the first area.

2. The display apparatus of claim 1, wherein each of the plurality of control elements corresponds to at least one of the pixels.

3. The display apparatus of claim 1, wherein the signal unit is disposed in the display panel.

4. The display apparatus of claim 1, wherein the first layer comprises a material of which the surface roughness is changed by ultraviolet rays.

5. The display apparatus of claim 4, wherein the display panel is an organic light-emitting display panel.

6. The display apparatus of claim 4, wherein the display panel is a liquid-crystal panel, and
wherein each of the plurality of optical elements comprises an ultraviolet band pass filter passing the ultraviolet rays.

7. The display apparatus of claim 6, wherein the ultraviolet band pass filter is arranged with an array of a red filter, a green filter, and a blue filter in the liquid-crystal panel.

8. The display apparatus of claim 6, further comprising a backlight unit providing visible rays and the ultraviolet rays to the liquid-crystal panel.

9. The display apparatus of claim 4, wherein an ultraviolet blocking filter is formed on a surface of the first layer.

10. The display apparatus of claim 1, wherein the first layer comprises a material of which a shape is changed according to heat energy applied to the first layer.

11. The display apparatus of claim 10, wherein the signal unit comprises a plurality of heaters transferring the heat energy to the first layer.

12. The display apparatus of claim 1, wherein the first layer comprises a material of which a shape is changed by an electric field.

13. The display apparatus of claim 12, wherein the signal unit comprises a plurality of electrodes forming the electric field on the first layer.

14. The display apparatus of claim 1, wherein when the texture represented by the image in the first area corresponds to a rough texture, the surface roughness of the first layer is increased with respect to a value near zero,
when the texture represented by the image in the first area corresponds to a soft texture, the surface roughness of the first layer is decreased with respect to the surface roughness of the first layer when the texture represented by the image in the first area corresponds to the rough texture, and when the texture represented by the image in the first area corresponds to a smooth texture, the surface roughness of the first layer is adjusted to have the value near zero.

15. The display apparatus of claim 1, wherein the first area where the first layer has the continuous peaks and valleys overlaps the first control element that generates the first signal and at least two pixels on opposite sides of the first control element.

16. A display apparatus comprising:
a display panel displaying an image, the display panel including a plurality of pixels configured to emit a light;
a first layer formed on a first surface of the display panel, a surface roughness of the first layer being changed at an area when a first signal is applied to the first layer, the surface roughness of the first layer being changed such that the first layer transitions from being flat to having continuous peaks and valleys in the area, wherein heights of the peaks and depths of the valleys are adjustable based on texture information of the image, wherein a width of the area where the first layer has the continuous peaks and valleys corresponds to a width of the first signal applied to the first layer, and wherein the first signal is based on a texture represented by the image in the area and is different from the light emitted by the plurality of pixels; and
a plurality of control elements applying the first signal to the first layer, at least one of the control elements being sandwiched between adjacent pixels of the plurality of pixels,
wherein the plurality of control elements includes at least one of a light source, a heat source, or an electrode,
wherein all the pixels remain fixed in position when the surface roughness of the first layer is changed,
wherein when the texture represented by the image in the area corresponds to a rough texture, the surface roughness of the first layer is increased with respect to a value near zero,
when the texture represented by the image in the area corresponds to a soft texture, the surface roughness of the first layer is decreased with respect to the surface roughness of the first layer when the texture represented by the image in the area corresponds to the rough texture, and
when the texture represented by the image in the area corresponds to a smooth texture, the surface roughness of the first layer is adjusted to have the value near zero.

17. The display apparatus of claim 16, wherein the plurality of control elements is disposed in the display panel or between the display panel and the first layer.

18. The display apparatus of claim 16, wherein an ultraviolet blocking filter is formed on the surface of the first layer.

* * * * *